(12) United States Patent
Vakrat et al.

(10) Patent No.: US 8,102,444 B2
(45) Date of Patent: Jan. 24, 2012

(54) METHOD AND APPARATUS FOR POST NOISE REDUCTION BLACK LEVEL CORRECTION

(75) Inventors: David Vakrat, Netanya (IL); Noam Korem, Haifa (IL)

(73) Assignee: Zoran Corporation, Sunnyvale, CA (US)

( * ) Notice: Subject to any disclaimer, the term of this patent is extended or adjusted under 35 U.S.C. 154(b) by 336 days.

(21) Appl. No.: 12/554,106

(22) Filed: Sep. 4, 2009

(65) Prior Publication Data
US 2010/0231764 A1 Sep. 16, 2010

Related U.S. Application Data

(60) Provisional application No. 61/096,138, filed on Sep. 11, 2008.

(51) Int. Cl.
*H04N 9/64* (2006.01)
*H04N 5/16* (2006.01)

(52) U.S. Cl. ......................................... 348/245; 348/257

(58) Field of Classification Search .................. 348/243, 348/245, 257
See application file for complete search history.

(56) References Cited

U.S. PATENT DOCUMENTS

| | | | |
|---|---|---|---|
| 6,829,007 B1 | 12/2004 | Bilhan et al. | |
| 7,136,942 B2 | 11/2006 | Kondo et al. | |
| 7,463,294 B2 * | 12/2008 | Tsuda | 348/251 |
| 2005/0094009 A1 | 5/2005 | Mori | |
| 2006/0092283 A1 | 5/2006 | Tanizoe et al. | |
| 2006/0176519 A1 | 8/2006 | Ouchi | |
| 2007/0013793 A1 | 1/2007 | Konda et al. | |
| 2007/0085917 A1 * | 4/2007 | Kobayashi | 348/241 |
| 2008/0094489 A1 | 4/2008 | Takamoto | |
| 2008/0192130 A1 | 8/2008 | Noh | |
| 2008/0239110 A1 | 10/2008 | Hara | |
| 2008/0291330 A1 | 11/2008 | Vakrat et al. | |
| 2010/0302415 A1 * | 12/2010 | Egawa | 348/243 |

OTHER PUBLICATIONS

International Search Report and Written Opinion in corresponding Patent Application No. PCT/US2009/056034 dated Oct. 29, 2009.

* cited by examiner

*Primary Examiner* — Timothy J Henn
(74) *Attorney, Agent, or Firm* — Lando & Anastasi, LLP

(57) ABSTRACT

Techniques for implementing a Black Level Correction (BLC) processing operation on image data signal pixel values that results in little to no nonlinearity in the dark areas of the image due to black noise clipping, and avoids reducing image quality or adding cost, are provided. Image data signal pixel values are caused to maintain black level while being operated on by image data signal processor circuits that precede a Noise Reduction (NR) processing operation, thus allowing the BLC processing operation to be executed after the NR processing operation. With black noise mostly removed, little to no nonlinearity in the dark areas of the image due to black noise clipping results from the BLC processing operation.

18 Claims, 9 Drawing Sheets

BLC – Black Level Correction
LSC – Lens Shading Correction
WBC – White Balance Correction
DRC – Dynamic Range Compression
CTM – Color Transformation Matrix GC – Gamma Correction
FC – Format Conversion (RGB->YUV)
NR – Noise Reduction
EE – Edge Enhancement BLC – Black Level Correction
LSC – Lens Shading Correction
WBC – White Balance Correction
DRC – Dynamic Range Compression
CTM – Color Transformation Matrix GC – Gamma Correction
FC – Format Conversion (RGB->YUV)
NR – Noise Reduction
EE – Edge Enhancement

| | Sensitive Logic |
|---|---|
| | Non-sensitive logic |
| | Sensitive Logic Isolation |

METHOD AND APPARATUS FOR POST NOISE REDUCTION BLACK LEVEL CORRECTION

CROSS-REFERENCE TO RELATED APPLICATIONS

This application claims priority under 35 U.S.C. §119(e) to U.S. Provisional Application Ser. No. 61/096,138, entitled "Late BLC (Post-NR BLC in High ISO Images)" filed on Sep. 11, 2008. In addition, this application is related to Published Patent Application US2008/0291330 entitled "Advanced Noise Reduction In Digital Cameras" published on Nov. 27, 2008. Each of these applications are expressly incorporated herein in its entirety for all purposes by this reference.

BACKGROUND OF INVENTION

1. Field of Invention

This invention relates to the processing of a digital representation of a signal from an optical image sensor, for example, the signal from the optical image sensor used in a digital image capture device such as a digital camera. More particularly, this invention relates to a system and method of digital image processing in which Black Level Correction (BLC) processing is until after Noise Reduction (NR) processing.

2. Discussion of Related Art

Signals produced by an optical image sensor used in an image capture apparatus, such as a digital camera, based on Charge Couple Device (CCD) or Complementary Metal Oxide Semiconductor (CMOS) technology, or, for that matter, any other optical image sensor technology, usually have a measured value when no light is impinging on the surface of the sensor. This signal output level is called "black level". Black level is usually, but not necessarily, approximately the same for all pixels in the image. In an effort to cause the image pixels to be at a 0 value when the optical image sensor is in total darkness, one of the earliest processes executed on the digital representation of the optical image sensor's analog output signal by the image data signal processor of the image capture apparatus, is the estimation and removal of the black level present in the image data signal. Removal is effected by subtracting the estimated black level from all the pixel values in the image. This operation is called Black Level Correction (BLC).

FIG. 1 is a graph showing the response of a typical optical image sensor to increasing light impinging on its surface, before the execution of a BLC processing operation. The response is shown after conversion from an analog to a digital signal.

FIG. 2 is a graph showing the response of a typical optical image sensor to increasing light impinging on its surface, after the execution of a BLC processing operation. The response is shown after conversion from an analog-signal to a digital signal. The black level of FIG. 1 has been corrected to black level of value 0 in FIG. 2.

In addition to black level, Images produced by signals from an optical image sensor almost always contain noise. The amount of noise in the image depends on the conditions under which the image was captured. These conditions include the amount of gain provided by the amplifier receiving the output of the optical image sensor signal and connected to the image capture apparatus' analog to digital converter. An image captured under high gain conditions is referred to as a "high ISO image", while an image captured under low gain conditions is referred to as a low ISO image. Exposure setting, for example lens aperture size and shutter speed, also affect the amount of noise in the captured image. The higher the light level on the surface of the optical image sensor and the longer the exposure time during the image capture process, the higher the level of the sensor's output signal and the lower the noise level in the captured image signal. The lower the light level on the surface of the optical image sensor and the shorter the exposure time during the image capture process, the lower the level of the sensor's output signal and the higher the noise level in the captured image signal. A major component of the noise level, called "shot noise" usually behaves as a square root function of the optical image sensor's output signal level. However, even in the absence of light, which produces a dark image sensor output signal, there will still be a certain amount of noise present. This noise is referred to as "black noise", and is electrical in nature.

FIG. 3 is a graph showing typical noise level on the output signal from an optical image sensor, as a function of image data signal level, before the execution of a BLC processing operation.

FIG. 4 is a graph showing the typical noise level on the output signal from an optical image sensor, as a function of image data signal level, after the execution of a BLC processing operation. The black level of FIG. 3 has been corrected to a black level of value 0 in FIG. 4.

A BLC processing operation, even when performed accurately, can result in negative pixel values. This is caused mainly by the black noise which may be present in the image. In most image data signal processors, the negative pixel values are clipped to 0. This causes an unbalanced noise distribution in dark areas of the image. Thus, once the noise is removed, either by an edge preserving low pass filter, median filter or almost any other Noise Reduction (NR) filter, the signal level in the dark areas of the image will be higher than the true signal level. Therefore, because of noise clipping that can occur during a BLC processing operation, black areas in the image may not be as black as they should be, thus producing an image with lower contrast. Further, noise clipping during a BLC processing operation increases the non-linearity of the sensor in dark areas. After applying white balance correction, this non-linearity may be translated into a false color cast in the dark areas of the image. The problem of noise clipping during a BLC processing operation becomes even more severe when an image is a high ISO image, because the image contains high noise levels.

FIG. 5 is a graph showing the typical black noise level distribution on the output signal from an optical image sensor, following the signal's conversion from an analog-signal to a digital signal, before the execution of a BLC processing operation.

FIG. 6 is a graph showing the typical black noise level distribution on the output signal from an optical image sensor, following the signal's conversion from an analog-signal to a digital signal, after the execution of a BLC processing operation that does not cause black noise clipping.

FIG. 7 is a graph showing the typical black noise level distribution on the output signal from an optical image sensor, following the signal's conversion from an analog-signal to a digital signal, after the execution of a BLC processing operation, that causes the signal's black noise level distribution to be clipped to signal values above pixel value 0.

FIG. 8 is a graph of the response of a typical optical image sensor to light impinging on its surface, after the execution of a BLC processing operation that does not cause the optical image sensor signal's black noise level distribution to be clipped to signal values above pixel value 0, such as shown in FIG. 6, as compared with the response obtained if a BLC processing operation that causes such clipping, such as shown in FIG. 7, is used. Note the increase in nonlinearity in the dark areas of the image when clipping occurs.

BLC clipping can be avoided by adding bits to the image processing path of an image capture apparatus, thus allowing the accurate processing of both positive and negative digital values without clipping. However, the cost or image quality impact of doing so can be prohibitive, especially for many digital camera applications. This is because this approach requires assigning a sign bit to each image pixel being processed. Thus, either the amount of memory used by the digital camera needs to be increased, to account for the extra sign bit, or the amplitude dynamic range of the digital camera's image pixels needs to decrease, as an existing bit is reassigned to serve as the sign bit. In the former case, manufacturing cost becomes a limiting factor. In the latter case, the loss of dynamic range can make the digital camera noncompetitive in terms of image quality.

SUMMARY OF INVENTION

It is therefore desirable to effect a BLC processing operation on image data signal pixel values that does not cause nonlinearity in the dark areas of the image due to black noise clipping, and avoids reducing image quality or adding cost. According to the present invention, image data signal pixel values are caused to maintain black level while being operated on by image data signal processor circuits that precede a Noise Reduction (NR) processing operation, thus allowing the BLC processing operation to be executed after the NR processing operation, causing little if any nonlinearity in the dark areas of the image due to black noise clipping. By using an advanced noise reduction processing operation, such as that described by Published Patent Application US2008/0291330 entitled "Advanced Noise Reduction In Digital Cameras", the noise can be almost completely removed, thereby mostly preventing the problem of noise clipping due to BLC operation, while avoiding image quality reduction or cost addition.

Image data signal pixel values are the result of digitizing the analog signal output from an optical image sensor. In most cases, this analog sensor signal has a measured value when no light impinges on the sensor's surface, therefore, along with the sensor output caused by light falling on the sensor's surface, the signal also has a black level. The preferred embodiment of the present invention offers a method of processing an optical image sensor signal that has a black level. This method is comprised of receiving the sensor signal at the input of an analog-to-digital converter, producing an image data signal composed of positive digital data values that includes a digital representation of the black level, processing the image data signal through a series of image data signal processing circuits, and producing a processed image data signal. In order to maintain black level and thereby minimize black noise clipping as the imaged data signal is serially processed, at least two of these circuits execute at least a black level processing operation that maintains image data signal input black level. A noise reduction processing operation is then performed, followed by a BLC processing operation, producing a black level corrected image data signal. Since the noise is almost completely removed before BLC, black noise clipping due to the BLC processing operation is mostly prevented. Thus, nonlinearity in the dark areas of the image due to black noise clipping is avoided.

An image data signal processor in which the method of the present invention is applied is comprised of a series of image data signal processing circuits. In order to maintain black level and thereby minimize black noise clipping as the imaged data signal is serially processed by these circuits, at least two of these circuits execute at least a black level processing operation that maintains image data signal input black level. A processing circuit then performs a noise reduction processing operation, followed by a processing circuit that performs a BLC processing operation. A black level corrected image data signal is thus produced. Since the noise is almost completely removed by the noise reduction circuit before BLC, black noise clipping due to the BLC processing operation is mostly prevented and nonlinearity in the dark areas of the image due to black noise clipping is avoided.

The method of the present invention can also be applied to a complete image capture apparatus, such as a digital camera. This apparatus has an optical image sensor that produces an analog output signal proportional to the luminance of a scene striking its surface through an optical system. Since the optical image sensor signal has a measured value when no light is striking its surface, the output signal includes a black level. The apparatus also has an amplifier receiving the output of the optical image sensor. Its output is connected to the input of an analog-to-digital converter. The analog-to-digital converter generates an image data signal from the amplified optical image sensor signal and produces an image data signal composed of positive digital data values along with a digital representation of the sensor signal black level. This image data signal is processed by an image data signal processor employing a series of image data signal processing circuits. In order to maintain black level and thereby minimize black noise clipping as the imaged data signal is serially processed by these circuits, at least two of these circuits execute at least a black level processing operation that maintains image data signal input black level. A processing circuit then performs a noise reduction processing operation, followed by a processing circuit that performs a BLC processing operation. A black level corrected image data signal is thus produced. Since the noise is almost completely removed by the noise reduction circuit before BLC, black noise clipping due to the BLC processing operation is mostly prevented and nonlinearity in the dark areas of the image due to black noise clipping is avoided.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE PREFERRED EMBODIMENT

The present invention will now be described more fully hereinafter with reference to the accompanying drawings, which form a part thereof, and which show, by way of illustration, a specific embodiment by which the invention may be practiced. The invention may, however, be embodied in many different forms and should not be construed as limited to the embodiment set forth herein; rather, this embodiment is provided so that this disclosure will be thorough and complete, and will fully convey the scope of the invention to those skilled in the art. Among other things, the present invention may be embodied as methods or devices. Accordingly, the present invention may take the form of an entirely hardware embodiment, and entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. The term "based on" is not exclusive and allows for being based on additional factors not described, unless the context clearly dictates otherwise. In addition, throughout the specification, the meaning of "a", "an", "and" and "the" include plural references. The meaning of "in" includes "in" and "on". Also, the use of "including", "comprising", "having", "containing", "involving", and variations thereof herein, is meant to encompass the items listed thereafter and equivalents thereof as well as additional items.

Figure 1:
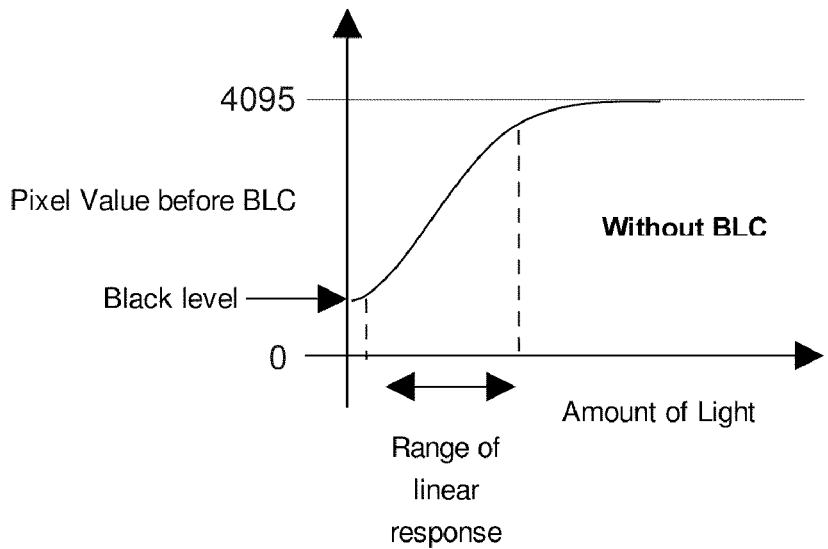
FIG. 1 is a graph showing, after conversion from an analog to a digital signal, the response of a typical optical image sensor to increasing light impinging on its surface, before the execution of a black level correction (BLC) processing operation.
Figure 2:
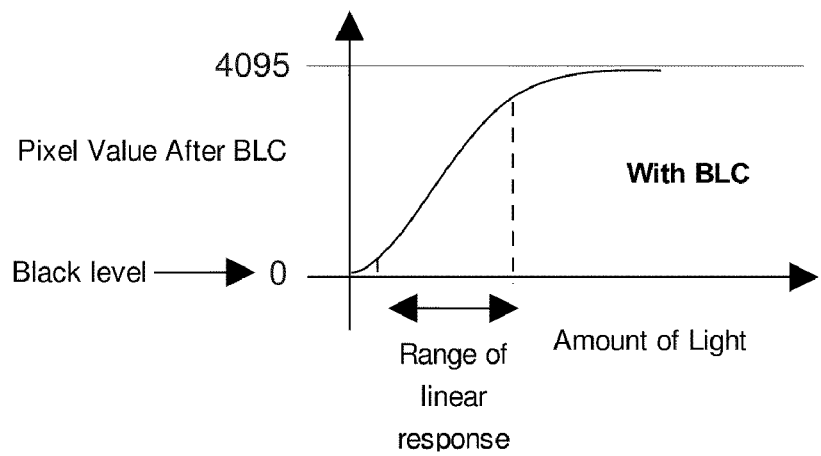
FIG. 2 is a graph showing, after conversion from an analog-signal to a digital signal, the response of a typical optical image sensor to increasing light impinging on its surface, after the execution of a BLC processing operation.
Figure 3:
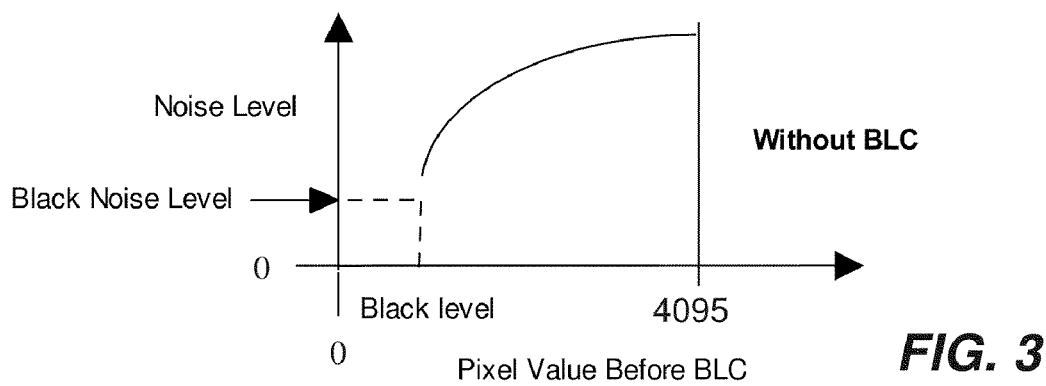
FIG. 3 is a graph showing typical noise level on the output signal from an optical image sensor, as a function of image data signal level, before the execution of a BLC processing operation.
Figure 4:
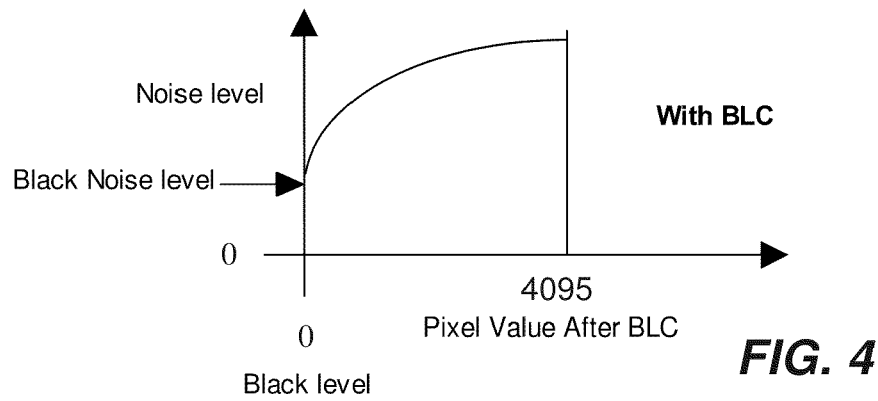
FIG. 4 is a graph showing the typical noise level on the output signal from an optical image sensor, as a function of image data signal level, after the execution of a BLC processing operation.
Figure 5:
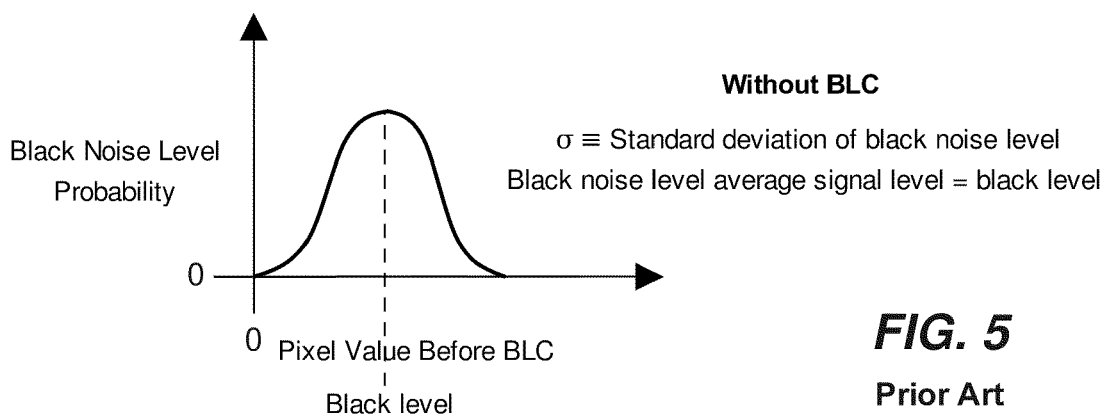
FIG. 5 is a graph showing the typical black noise level distribution on the output signal from an optical image sensor, following the signal's conversion from an analog-signal to a digital signal, before the execution of a BLC processing operation.
Figure 6:
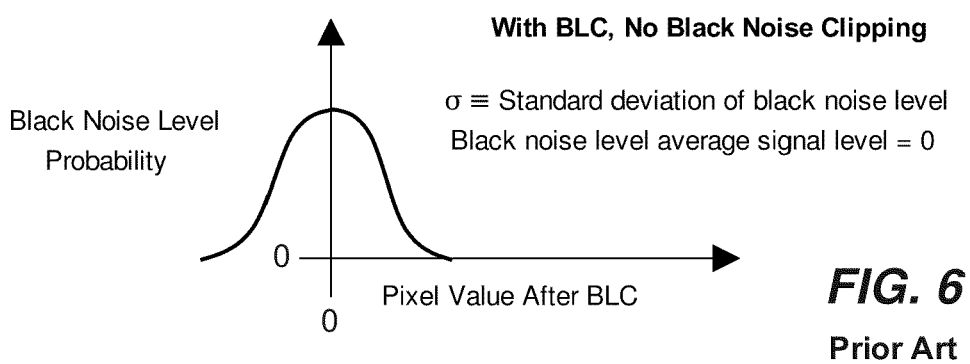
FIG. 6 is a graph showing the typical black noise level distribution on the output signal from an optical image sensor, following the signal's conversion from an analog-signal to a digital signal, after the execution of a BLC processing operation that does not cause black noise clipping.
Figure 7:
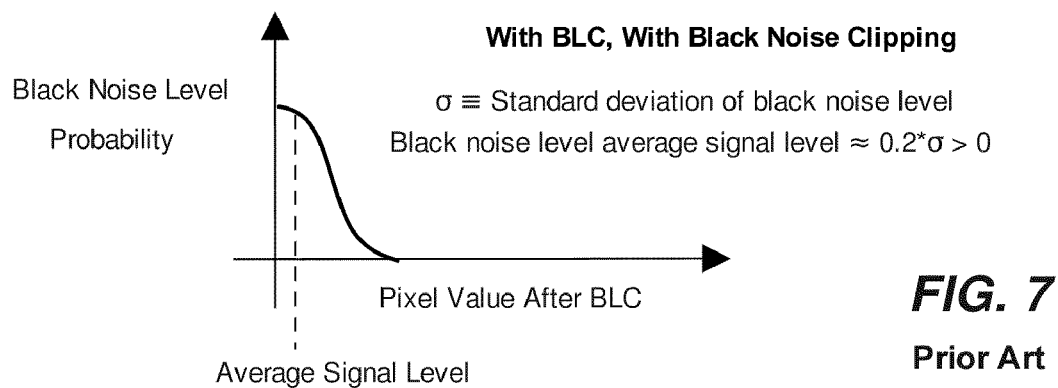
FIG. 7 is a graph showing the typical black noise level distribution on the output signal from an optical image sensor, following the signal's conversion from an analog-signal to a digital signal, after the execution of a BLC processing operation that causes the signal's black noise level distribution to be clipped to signal values above pixel value 0.
Figure 8:
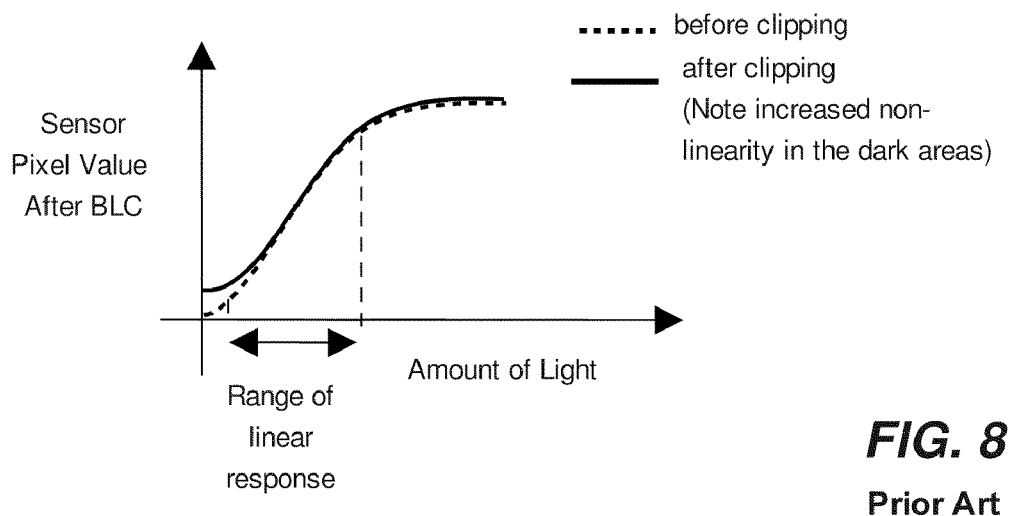
FIG. 8 is a graph of the response of a typical optical image sensor to light impinging on its surface, after the execution of a BLC processing operation that does not cause the optical image sensor signal's black noise level distribution to be clipped to signal values above pixel value 0, as compared with the response obtained if a BLC processing operation that causes such clipping is used.
Figure 9:
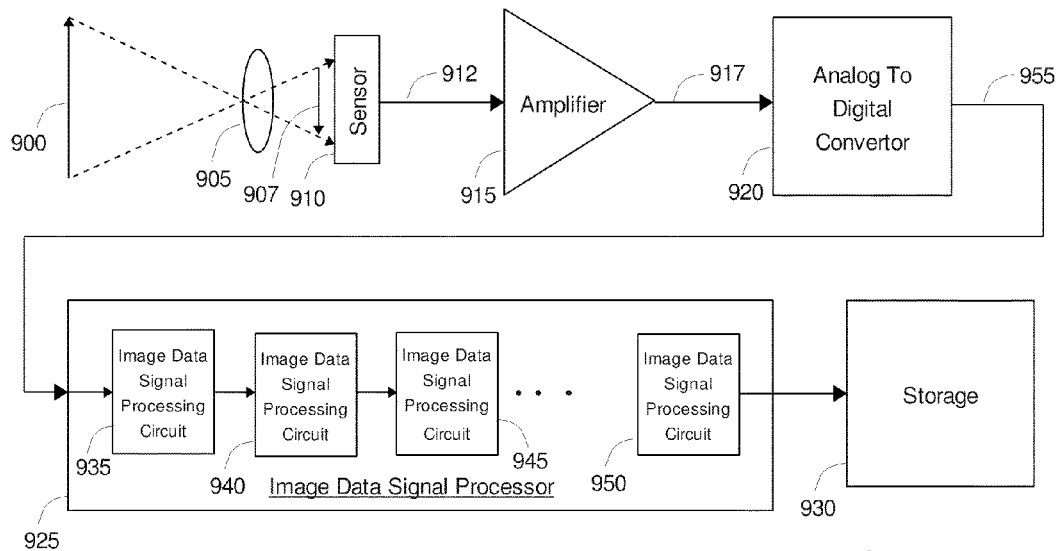
FIG. 9 is a block diagram of a digital camera or other image capture apparatus that include an image data signal processor with a plurality of image data signal processing circuits.

FIG. 9 shows a digital camera or other image capture apparatus which includes an imaging optical system 905, an optical image sensor 910, an analog amplifier 915, an analog to digital converter 920, an image data signal processor 925, and an image data storage unit 930. The image data storage unit could be a memory card or an internal nonvolatile memory. Data of images captured by the camera may be stored on the image data storage unit. The optical system 905 can be a single lens, as shown, but will normally be a set of lenses. An image 907 of a scene 900 is formed in visible optical radiation onto a two-dimensional surface of an image sensor 910. An electrical output 912 of the sensor carries an analog signal resulting from scanning individual photo-detectors of the surface of the sensor 910 onto which the image 907 is projected. Signals proportional to the intensity of light striking the individual photo-detectors are obtained in the output 912, along with a "black level", a measured value output from the sensor when no light is impinging on its surface. The analog signal 912 is applied through an amplifier 915 to an analog to digital converter 920 by means of amplifier output 917. Analog to digital converter 920 generates an image data signal from the analog signal at its input and, through output 955, applies it to image data signal processor 925. The photo-detectors of the sensor 910 typically detect the intensity of the light striking the image pixel in one of two or more individual color components. Early detectors detected only two separate color of the image. Detection of three primary colors, such as red, green and blue (RGB) components, is now common. Currently image sensors that detect more than three color components are becoming available.

Multiple processing operations are performed on the image data signal from analog to digital converter 920 by image data signal processor 925. Processing of the image data signal, in this embodiment, is shown in FIG. 9 as being effected by multiple image data signal processing circuits within image data signal processor 925. However, these circuits can be implemented by a single integrated circuit image data signal processor chip that may include a general purpose processor that executes algorithmic operations defined by stored firmware, multiple general purposed processors that execute algorithmic operations defined by stored firmware, or dedicated processing logic circuits as shown. Additionally, these operations may be implemented by several integrated circuit chips connected together, but a single chip is preferred. FIG. 9 depicts the use of image data signal processing circuits 935,

940, 945, and 950 connected in series to effect multiple algorithmic processing operations. More of such circuits, as indicated by the dots between circuit 945 and 950, can be included. This series structure is known as a "pipe line" architecture. This architectural configuration is employed as the exemplary embodiment of the present invention, however other architectures can be used. For example, an image data signal processor with a "parallel architecture", in which one or more image data signal processing circuits are arranged to receive processed image data signals from a plurality of image data signal processing circuits, rather than after they have been processed serially by all preceding image data signal processing circuits, can be employed. A combination of a partial parallel and a partial pipeline architectures is also a possibility.

The series of image data signal processing circuits of image data processor 925, is called an "image processing pipe". The present invention identifies those image data signal processing circuits that are "sensitive" to the existence of black level in the image data signal pixel values. Such image processing operations incorporate "image processing logic" that does not work properly unless black level is corrected prior to its execution. Sensitive image data signal processing circuits using such logic include White Balance Correction (WBC), Lens Shading Correction (LSC), Gamma Correction (GC), Color Transformations (CTM), and Dynamic Range Compression (DRC). Image data signal processing circuits that use logic that is normally unaffected by the existence of black level in the image data signal pixel values include Demosaicing, Noise Reduction (NR), Edge Enhancement (EE), scaling, and geometric transformations, such as lens distortion correction.

Figure 10:
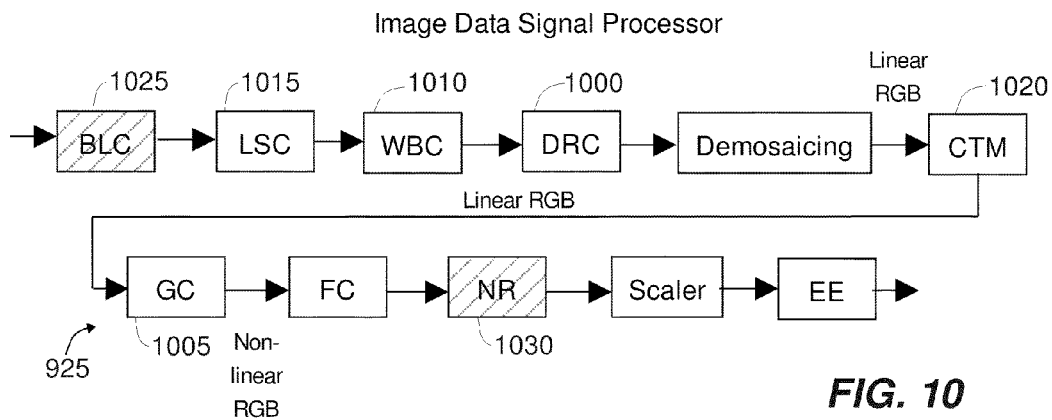
FIG. 10 is a block diagram of an image data signal processor.

FIG. 10 depicts a possible ordering of the image data signal processor circuits 925 of FIG. 9. BLC is the first processing operation, so BLC circuit 1025 is placed at the beginning of the image processing pipe line and receives the image data signal pixel values coming from analog to digital converter 920, over line 955, of FIG. 9. NR circuit 1030 is placed later in the pipeline. This arrangement permits sensitive circuits LSC 1015, WBC 1010, DRC 1000, CTM 1020, and GC 1005 to properly perform, because black level has already been corrected. However, since the NR processing operation is postponed until after the execution of BLC processing operation, BLC can clip black noise on the image data signal and cause nonlinearity in the dark areas of the image.

Figure 11:
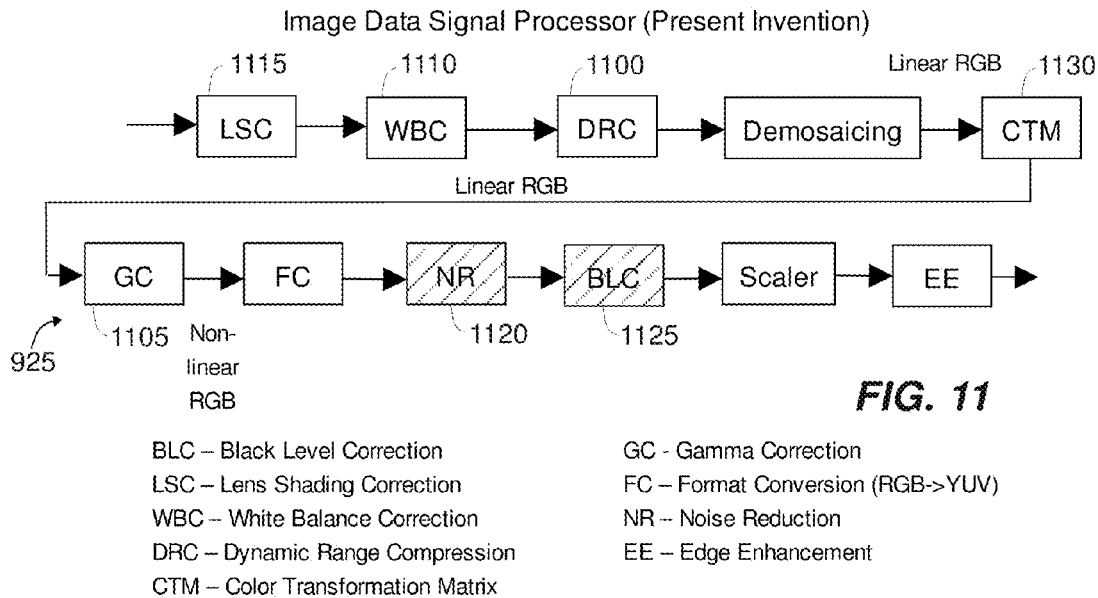
FIG. 11 is a block diagram of an image data signal processor employing the techniques of the present invention.

FIG. 11 shows image data signal processor 925 with image data signal processing circuits arranged in the order of the preferred embodiment. As can be seen from FIG. 11, the BLC circuit 1125 is placed after the NR circuit 1120, while circuits LSC 1115, WBC 1110, DRC 1100, CTM 1130 and GC 1105 remain in the same locations shown in FIG. 10. This allows black noise to have been effectively removed from the image data signal pixel values before the BLC processing operation is executed, thus mitigating nonlinearity in the dark areas of the image due to black noise clipping. To permit the BLC processing operation to be delayed until after the NR processing operation, image data signal black level must be maintained as it is passes through the image processing pipe, and the sensitive image data signal processing circuits must be configured such that black level present in the image data pixel values does not prevent them from working properly.

Processing logic that is sensitive to image data signal pixel black level is usually performed on individual pixel values, without considering the values of neighboring pixels, while processing logic that considers neighboring pixels is usually not sensitive. This permits sensitive processing logic to be identified and separated from nonsensitive processing logic.

Figure 12A:
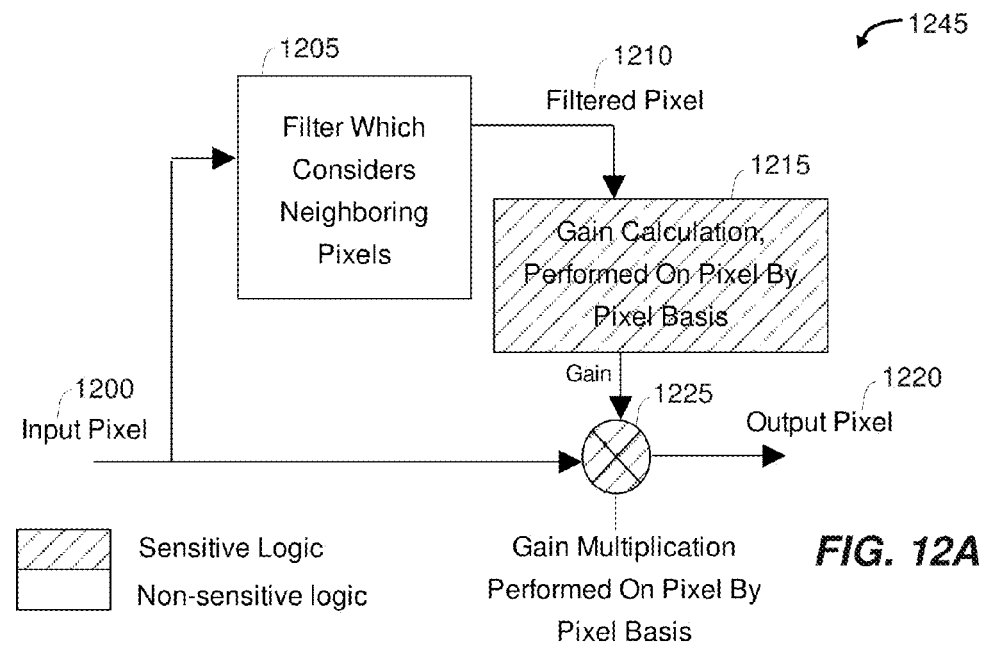
FIG. 12A is a block diagram showing an image data signal processing circuit separated into logic that is sensitive to the existence of black level on the input to the circuit, and logic that is not sensitive to the existence of black level on the input to the circuit.

As shown in FIG. 12A, sensitive DRC logic incorporated into example DRC image data signal processing circuit 1245 can be separated into the sensitive and non-sensitive logic blocks. Block 1205 of FIG. 12A is DRC filter logic that utilizes neighboring pixels to achieve its functionality, and is therefore a non-sensitive logic block, while blocks 1215 and 1225 comprise DRC logic performing a gain calculation that operates on individual image data pixels, and is therefore sensitive logic.

Figure 12B:
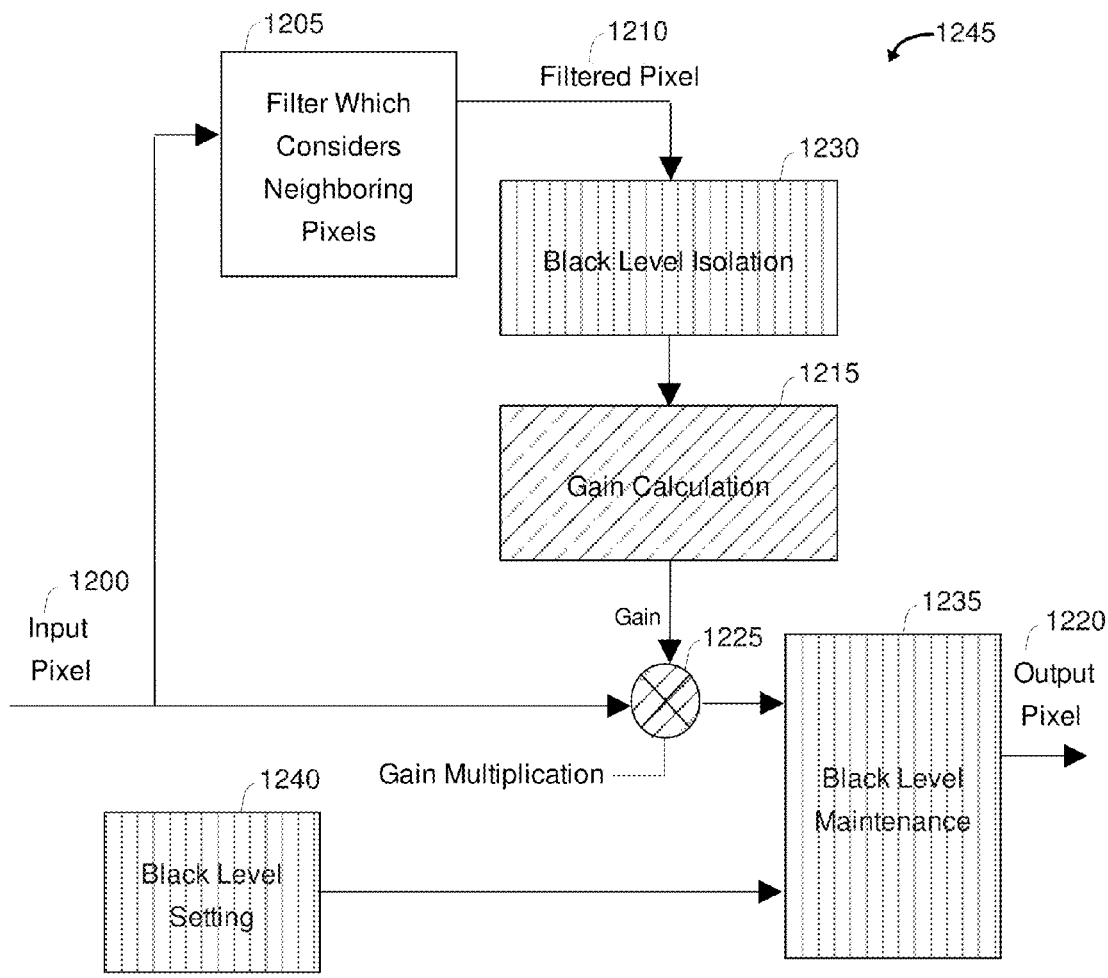
FIG. 12B is a block diagram illustrating the preferred embodiment for isolating sensitive logic incorporated in an image data signal processing circuit.

FIG. 12B expands on FIG. 12A and illustrates the present invention's approach to isolating sensitive logic incorporated in image data signal processing circuit 1245. Specifically block 1230 of FIG. 12B prevents the black level component of the image data signal input to circuit 1245 from reaching sensitive logic blocks 1215 and 1225, thus allowing these blocks to work properly even though the image data signal input pixels contain black level. Block 1235 maintains a black level in the image data pixels output from circuit 1245, thus allowing black level to be provided to the next image data signal processing circuit in the image processing pipe, while Block 1240 causes the maintained black level in the image data pixels output from circuit 1245 to be substantially equal to the mean value of the black noise level in the image data signal input to circuit 1245. According to the present invention, blocks similar to 1230, 1235 and 1240 of FIG. 12B are employed in image data signal processing circuits incorporating sensitive logic throughout the image processing pipe, in addition to DRC circuit 1245. Such circuits include LSC 1115, WBC 1110, DRC 1100, CTM 1130 and GC 1105 of FIG. 11, thus permitting BLC processing operation 1125 of FIG. 11 to be postponed until after the NR processing operation 1120 of FIG. 11. In this manner, nonlinearity in the dark areas of the image data signal output from image data signal processor 925 of FIG. 11, due to BLC operation 1125 clipping black noise, is avoided.

In order to keep the impact on image processing pipes currently used in digital cameras and other image capture apparatus to a minimum, and thus make the implementation of the present invention in commercial products desirable, the present invention takes into account the following requirements while (1) isolating sensitive logic blocks in circuits in the pipe from input image data signal black level, and (2) maintaining black level on the output of the circuit. First the maximum range of pixel values at the output of the circuit needs to be kept the same as it was before isolating the sensitive logic incorporated in the circuit. For example, a circuit with a sensitive logic block that produced positive pixel values before sensitive logic isolation, must be configured such that it does not produce negative pixel values after its circuitry is altered to isolate sensitive logic and maintain black level on its output. This is to assure that the immediately following image data signal processing circuit in the pipe, that expects to receive only positive values, can function properly without major modification. Second, the preferred embodiment of the present invention needs to isolate sensitive logic blocks from the black level component of the image data signal input to circuit, and maintain black level on the circuit's output, by adding new logic around the original sensitive logic in the block, and, as much as possible, not by modifying the original sensitive logic.

Figure 13:
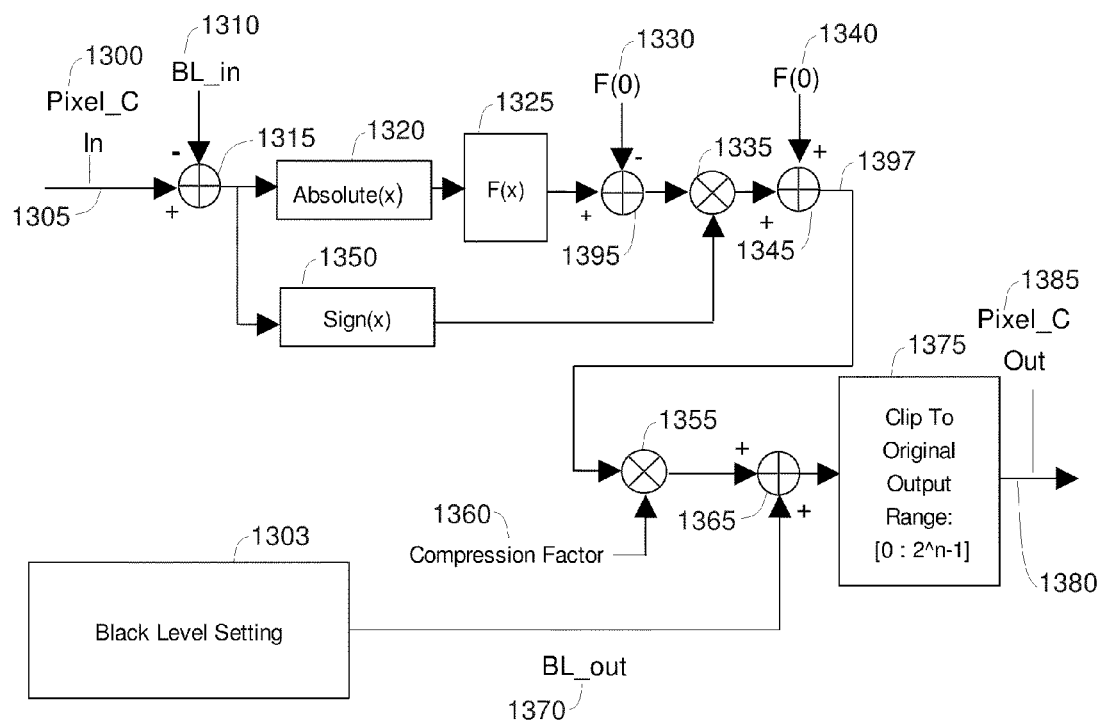
FIG. 13 is a block diagram depicting an image data signal processing circuit of the present invention that maintains black level from the input to the output of the image data signal processing circuit while permitting sensitive logic function F(x) to work properly and preventing black noise clipping.

FIG. 13 illustrates an example of the principles of the present invention as applied to image data signal processing circuit 1390 incorporating a sensitive logic block performing the function F(x) block 1325 on a single color component Pixel_C 1300. The solution provides circuitry components black level setting block 1303, adder 1315, absolute value(x) circuit 1320, sign value(x) circuit 1350, adder 1395, multiplier 1335, adder 1345, multiplier 1355, adder 1365, and clipper 1375 around the F(x) block 1325 logic. These components allow F(x) block 1325 to operate correctly when the image data signal input to the circuit has a black level component BL_in 1310, and also maintains black level BL_out 1370 on line 1380, the output of circuit 1390. In this case function F(x) 1325 is assumed to be a Gamma Correction image processing operation, such as FIG. 11 GC 1105. Although White Balance Correction, FIG. 11 WBC of 1110, or Lens Shading Correction, FIG. 11 LSC 1115, could also serve to illustrate the principles of the present invention shown in FIG. 13, GC 1105 is believed to be the best example and serves as F(x) block 1325 in the following discussion, where F(0)=0.

Since F(x) 1325 is an image processing function that incorporates sensitive logic, it needs the black level component of the pixel values input to the function removed before it is executed in order to function properly and produce correct output values. The present invention achieves the correct operation of F(x) block 1325 logic by subtracting the black level BL_in 1310 from input pixel value Pixel_C 1300, at adder 1315. BL_in 1310 is equal to the black level on Pixel_C 1300. Pixel_C 1300 is one color component of the pixel value entering image data signal processing circuit 1390 over input line 1305.

The output from signal processing circuit 1390 needs to contain black level so black level can be fed to the next signal processing circuit in the image processing pipe. This is achieved by adding BL_out 1370 to the output pixel value by the use of adder 1365, after F(x) is performed.

The subtraction of BL_in from the input pixel value Pixel_C in 1300, at adder 1315, may produce negative values due to black noise. It is important to prevent these values from being clipped to 0 by range clipper 1375, which clips circuit 1390 output, Pixel_C out 1385 on output line 1380, to its original output range. By the use of absolute value(x) circuit 1320, sign value(x) circuit 1350, adder 1330, adder 1340 and recalling that F(0)=0, a negative black noise value, −x, where x is a positive value, at the output of adder 1315, will pass through F(x) 1325 and produce the value:

$$\text{sign}(-x)*F(\text{absolute}(-x))=-F(x)$$

where:
sign(−x) is produced by sign value (x) circuit 1350, and;
absolute(−x) is produced by absolute value (x) circuit 1320,
at the input to range compression factor multiplier 1355. Since the probability of a black noise +x value is equal to the probability of a black noise −x value, the probability of F(x) is equal to the probability of −F(x), and it can be seen that the mean value of the black noise level after the execution of F(x) will be equal to 0. Multiplying this value by range compression factor 1360, at multiplier 1355, will not change the mean value of the black noise level at the output of multiplier 1355.

Still referring to FIG. 13, the output of multiplier 1355 is input to adder 1365, where BL-out 1370 is added. BL_out 1370 is substantially equal to the mean value of the black noise level appearing on input line 1305, the input to circuit 1390. It is provided by black level setting block 1303. After adding black level BL_out 1370 by the use of adder 1365, the mean value of the black noise level at the output of adder 1365 will be equal to BL_out, a positive value, since, as previously discussed, the mean value of the black noise level after F(x) is equal to 0. Thus, the clipping of black noise negative values by output range clipper 1375 that follows adder 1365 will be minimal due to the addition of BL_out 1370. By using the described approach, the present invention prevents black noise clipping while maintaining black level at the output of circuit 1390, line 1380, allowing the next image data signal processing circuit in the image processing pipe to work properly.

After adding BL_out 1370, Top_limit of circuit 1390 may be exceeded. Top_limit is equal to the greatest digital signal value that the output of circuit 1390, the processed image data signal appearing on output line 1380, is allowed attain. Top_limit is set in order to maintain the original output range of circuit 1390, that is the digital output range before the addition of BL_out 1370. In the preferred embodiment of the present invention, Top_limit equals $(2^n-1)$, where n is the width of circuit 1390's processing path. Thus, if circuit 1390 employs a 10 bit path, n=10, $(2^{10}-1)=(1024$ digital levels−1) and Top_limit=digital value 1023. If circuit 1390 employs a 12 bit path, n=12, and $(2^{12}-1)=(4096$ digital levels−1) and Top_limit=digital value 4095. As shown in FIG. 13, Top_limit is effected by clipper 1375. To minimize the amount of values that exceed Top_limit, FIG. 13 multiplier 1355 multiplies the processed image data pixel value appearing on line 1397 by compression factor 1360, which is smaller than 1 and greater than ((Top_limit−BL_out)/Top_limit), before BL_out 1370 is added by adder 1365. Setting the compression factor to ((Top_limit−BL_out)/Top_limit) will almost entirely prevent values from exceeding Top_limit. Note that using such a compression factor may cause a small reduction in the accuracy of the values output from circuit 1390. However, in high ISO images, the reduction in accuracy is negligible compared with the benefits of substantially canceling black noise clipping.

In FIG. 13, two parameters can be adjusted to control the operation of the present invention as it is applied to various sensitive image processing logic functions. These two parameters are BL_out 1370, and Compression_Factor 1360, and the list of sensitive image processing logic functions that can be used as F(x) block 1325 of FIG. 13 includes White Balance Correction (WBC), Lens Shading Correction (LSC), Gamma Correction (GC), Color Transformations (CTM), and Dynamic Range Compression (DRC). In general, the values of these parameters are determined by the preferences of the manufacturer of a particular image capture apparatus, taking the following into consideration:

The value of BL_out 1370, determines the amount of black noise clipping. Although nominally set by black noise level setting block 1303 to substantially equal the mean value of the black noise level appearing on input line 1305, smaller values will increase black noise clipping, while higher values will minimize black noise clipping. However, higher values may damage the processed image data signal output on line 1380, either by pushing the high level signals into saturation, thus causing clipper 1375 to clip values above Top_limit, or by reducing the accuracy of the range, by forcing the use of a lower compression factor 1360.

Compression factor 1360 handles the trade off between pushing high level signals above Top_limit so they are clipped by clipper 1375, and reducing the accuracy of the range of the processed image data signal appearing on output line 1380. It is normally within the range of ((Top_limit−BL_out)/Top_limit) to 1. Higher values will minimize the damage to accuracy, while increasing the amount of signals pushed into saturation. Lower values will reduce accuracy, while minimizing the amount of signals pushed into saturation.

For sensitive logic operating in the linear domain, such as that incorporated into WBC circuit 1110 or LSC circuit 1115 shown in FIG. 11, meaning it is executed prior to the execution of GC logic, such as that found in GC circuit 1105, also shown in FIG. 11, it is recommended that Compression_Factor 1360 be set to 1. The reason for this is that accuracy is very important in the linear domain, especially for low signal levels. In addition, clipping values that exceed output range Top_limit may be acceptable in the linear domain, for 2 reasons: (a) these values are likely to be compressed into saturation by an image data signal processing circuit that performs the GC operation, such as GC circuit 1105; and (b) the values that exceed Top_limit will probably not be reliable. For example, in the WBC logic function incorporated into WBC circuit 1110, the red and blue signal components are multiplied by a factor greater than 1. This may cause red and blue signal components to exceed the output range after the addition of BL_out 1370. However, these signals may contain false color, since the green signal component cannot exceed the output range, since green is used as reference. It may therefore be advantageous to discard exceeding values due to WBC processing and allow clipper 1375 to clip them into saturation.

For sensitive logic operating in the gamma corrected domain, such as in GC image data signal processing circuit 1105 of FIG. 11 itself, it is recommended to set Compression_Factor to ((Top_limit−BL_out)/Top_limit). This is mainly to prevent valid signals from being pushed into saturation unnecessarily. As mentioned above, this may cause some damage to pixel value accuracy. In order to compensate for this reduction in accuracy, it is therefore recommended to maintain a high accuracy image processing pipe until after NR and BLC processing, such as that performed in NR circuit 1120 and BLC circuit 1125 in FIG. 11. "High accuracy" means higher accuracy than that of the image processing pipe output. Most image processing pipes currently output 8 bit data, so at least 10 bit accuracy is recommended until after NR and BLC processing. Even if high accuracy cannot be maintained until after NR and BLC, the damage to accuracy in high ISO images is negligible compared with the benefits of canceling noise clipping by the use of the present invention to implement post noise reduction black level correction.

The present invention can be applied to sensitive logic generating a parameter instead of image data pixel value. For example, the present invention can be applied to sensitive logic generating a gain parameter as a function of pixel value, as is shown in FIG. 12A block 1215, or sensitive logic generating noise thresholds as function of pixel values. Usually when generating a parameter instead of pixel value, BL_out should be configured to 0, and Compression_Factor should be configured to 1.

Figure 14:
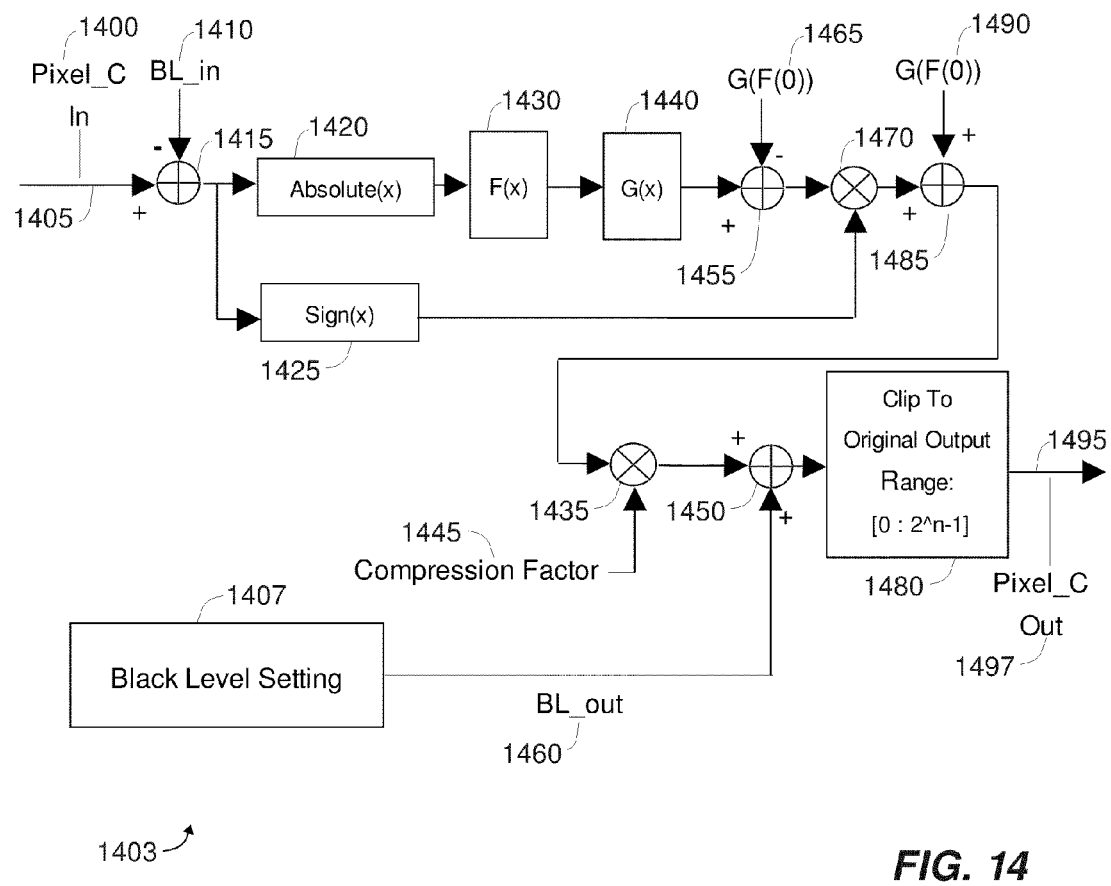
FIG. 14 is a block diagram depicting an image data signal processing circuit of the present invention that maintains black level from the input to the output of the image data signal processing circuit while permitting 2 consecutive sensitive logic functions F(x) and G(x) to work properly and preventing black noise clipping.

FIG. 14 is an example of the principles illustrated by FIG. 13 applied to a plurality of consecutively executed sensitive logic blocks. It shows how sensitive logic blocks 1430 and 1440, incorporated in image data signal processing circuit 1403, executing the functions F(x) and G(x) on a single color component, Pixel_C in 1400, can be configured, using the principles of the present invention, such that F(x) G (x) is able to maintain black level while preventing black noise clipping. F(x) could represent sensitive logic incorporated in LSC circuit 1115 and G(x) could represent sensitive logic incorporated in WBC circuit 1110, both of FIG. 11. The adder 1415, absolute value function 1420, sign function 1425, adder 1455, multiplier 1470, adder 1485, multiplier 1435, adder 1450, black level setting block 1407, clipper 1480 and their respective input parameters, of FIG. 14, are essentially equivalent to their counterparts, adder 1315, absolute value function 1320, sign function 1350, adder 1395, multiplier 1335, adder 1345, multiplier 1355, adder 1365, black level setting block 1303, and clipper 1375 of FIG. 13. The series of logic blocks 1430, executing F(x), and logic block 1440, executing G(x), of FIG. 14 serve as the counterpart to logic block 1325 of FIG. 13, executing function F(x) of FIG. 13, while parameters 1465 G(F(0)), 1490 G(F(0)), compression factor 1445, and BL_out 1460 of FIG. 14 serve as the counterparts to parameters 1330 F(0), 1340 F(0), compression factor 1360, and BL_out 1370 of FIG. 13. The above discussion related to image data signal processing circuit 1390 illustrated in FIG. 13, serves well for image data signal processing circuit 1403 illustrated in FIG. 14.

Figure 15:
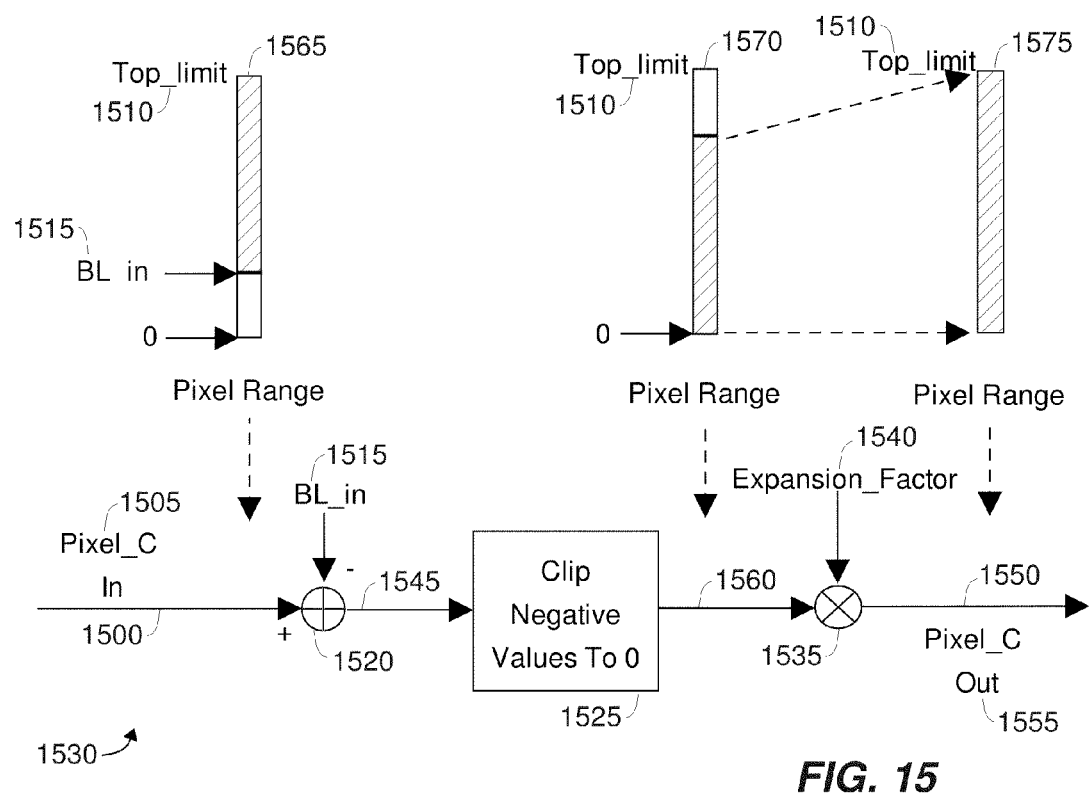
FIG. 15 is a block diagram illustrating a BLC image data signal processing operation of the present invention.

The present invention calls for a BLC operation, such as that incorporated in BLC circuit 1125 of FIG. 11, to be performed after a NR operation, such as that incorporated in NR circuit 1120 of FIG. 11. A BLC image data signal processing operation of the present invention, BLC operation 1530, is depicted in FIG. 15. It includes: (a) the subtraction of black level BL_in 1515 from Pixel_C in 1505 on line 1500, by the use of adder 1520. Pixel_C in 1505 represents the single color component image data signal pixel values input to BLC operation 1530; (b) safely clipping negative values produced by the subtraction to 0 by use of negative value clipper 1525. This clipping action causes little if any nonlinearity in the dark areas of the image due to black noise clipping, since BLC operation 1530 is executed after a NR operation, such as that incorporated in NR circuit 1120 of FIG. 11, and most of the black noise has been removed; and (c) expanding the black level corrected image data signal output range to compensate for the black level which was removed, by the use of multiplier 1535 using programmable expansion factor 1540, a factor greater than 1, resulting in Pixel_C out 1155 on output line 1550. This factor is equal to (Top_limit/(Top_limit−BL_in)). Top_limit 1510 is the maximum digital value allowed to be processed by the BLC operation, and serves to define the BLC operation maximum output range and acceptable input range. BL_in 1515 is the input black level from the immediately preceding NR circuit, NR circuit 1115 of FIG. 11 for example, which is corrected by BLC operation 1530.

FIG. 15 bar graph 1565 indicates the input range of the image data signal input pixel, Pixel_C 1505, to the image data signal processing circuit which incorporates BLC operation 1530. The white space between 0 and BL_in 1515 indicates the black level to be removed from the image data signal input; adder 1520 subtracts BL_in 1515; clipper 1525 clips negative values of the black level corrected image data signal; bar graph 1570 indicates the range of the black level corrected image data signal; and multiplier 1535, using expansion factor 1540, expands the clipped black level corrected image data signal input to fill the output image data signal range window, indicated in bar graph 1575.

Having thus described several aspects of the preferred embodiment of the present invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of processing a signal from an optical image sensor, said optical image sensor producing an optical image sensor signal, wherein the optical image sensor signal has a measured value when no light is impinging on the surface of the optical image sensor, said value being the signal's black level, comprising:

receiving the optical image sensor signal at the input of an analog-to-digital converter, wherein the analog-to-digital converter produces an image data signal therefrom that is composed of positive digital data values and includes a digital representation of the optical image sensor signal black level;

processing the image data signal through a plurality of image data signal processing circuits, wherein at least two of such circuits execute at least a black level processing operation on the image data signal input to the image data signal processing circuit producing a processed image data signal;

executing a noise reduction processing operation on the processed image data signal producing a noise reduced image data signal; and executing a black level correction processing operation on the noise reduced image data signal producing a black level corrected image data signal.

2. The method of claim 1, wherein the black level processing operation includes:

minimizing black noise clipping by subtracting the image data signal black level from the image data signal while maintaining positive image data signal values; and adding a black level to the image data signal, wherein the value of the black level added is substantially equal to the mean value of the image data signal's black noise level.

3. The method of claim 1 wherein the image data signal processing circuits are one or more programmable general purpose processors.

4. The method of claim 1 wherein an image data signal processing circuit which executes at least the black level processing operation on the image data signal received at its input executes two or more other processing operations consecutively.

5. The method of claim 1 wherein a maximum image data signal range at the output of the image data processing circuits which perform at least the black level processing operation on the image data signal is substantially the same as a maximum image data signal range at the input to the image data processing circuits.

6. The method of claim 1 wherein positive image data signal values at the input to the image data signal processing circuits which perform at least the black level processing operation on the image data signal are positive at the output from the image data processing circuits.

7. An image data signal processor that processes signals from an optical image sensor, wherein the optical image sensor signal has a measured value when no light is impinging on the surface of the optical image sensor, said value being the signal's black level, and wherein said signal has been converted to a digital signal therefrom that is composed of positive digital data values and includes a digital representation of the optical image sensor signal black level at its output comprising:

a plurality of image data signal processing circuits, wherein at least two of such circuits are implemented at least partially in hardware and execute at least a black level processing operation on the image data signal input to the image data signal processing circuit producing a processed image data signal;

an image data signal processing circuit executing a noise reduction processing operation on the processed image data signal producing a noise reduced image data signal; and an image data signal processing circuit executing a black level correction processing operation on the noise reduced image data signal producing a black level corrected image data signal.

8. The image data signal processor of claim 7 wherein the image data signal processing circuits which execute at least the black level processing operation on the image data signal include:

circuitry for subtracting the image data signal black level from the image data signal values while maintaining positive image data signal values, thereby minimizing black noise clipping; and circuitry for adding a black level to the image data signal, wherein said circuitry adds a black level which is substantially equal to the mean value of the image data signal's black noise level.

9. The image data signal processor of claim 7 wherein the image data signal processing circuits are one or more programmable general purpose processors implemented on at least one integrated circuit chip.

10. The image data signal processor of claim 7 wherein an image data signal processing circuit which executes at least the black level processing operation on the image data signal received at its input executes two or more other processing operations consecutively.

11. The image data signal processor of claim 7 wherein a maximum image data signal range at the output of the image data processing circuits which perform at least the black level processing operation on the image data signal is substantially the same as a maximum image data signal range at the input to the image data processing circuits.

12. The image data signal processor of claim 7 wherein positive image data signal values at the input to the image data signal processing circuits which perform at least the black level processing operation on the image data signal are positive at the output from the image data processing circuits.

13. An image capture apparatus comprising:

an optical image sensor having an analog signal output proportional to a luminance of an optical image incident thereon, wherein the optical image sensor signal output has a measured value when no light is impinging on the surface of the optical image sensor, said value being the signal's black level;

an optical system that casts an image of an object scene onto the optical image sensor;

an amplifier receiving the output of the optical image sensor and connected to the input of an analog-to-digital converter;

an analog-to-digital converter that generates an image data signal from the amplified optical image sensor signal, said image data signal being composed of positive digital data values and a digital representation of the optical image sensor signal black level;

an image data signal processor that receives the image data signal data from the analog-to-digital converter and processes the image data signal through a plurality of image data signal processing circuits;

at least a first and a second image data signal processing circuit, each executing at least a black level processing operation on the image data signal input to the image data signal processing circuit, producing a processed image data signal;

a third image data signal processing circuit executing a noise reduction processing operation on the processed image data signal producing a noise reduced image data signal; and a fourth image data signal processing circuit executing a black level correction processing operation on the noise reduced image data signal producing a black level corrected image data signal.

14. The image capture apparatus of claim 13 wherein the image data signal processing circuits which execute at least the black level processing operation on the image data signal include:
- circuitry for subtracting the image data signal black level from the image data signal values while maintaining positive image data signal values, thereby minimizing black noise clipping; and
- circuitry for adding a black level to the image data signal, wherein said circuitry adds a black level which is substantially equal to the mean value of the image data signal's black noise level.

15. The image capture apparatus of claim 13 wherein the image data signal processing circuits are one or more programmable general purpose processors.

16. The image capture apparatus of claim 13 wherein an image data signal processing circuit which executes at least the black level processing operation on the image data signal received at its input executes two or more other processing operations consecutively.

17. The image capture apparatus of claim 13 wherein a maximum image data signal range at the output of the image data processing circuits which perform at least the black level processing operation on the image data signal is substantially the same as a maximum image data signal range at the input to the image data processing circuits.

18. The image capture apparatus of claim 13 wherein positive image data signal values at the input to the image data signal processing circuits which perform at least the black level processing operation on the image data signal are positive at the output from the image data processing circuits.

* * * * *